(12) United States Patent
Lim et al.

(10) Patent No.: US 7,062,097 B2
(45) Date of Patent: *Jun. 13, 2006

(54) COMPUTATIONAL GRACEFUL DEGRADATION METHOD USING PRIORITY INFORMATION IN MULTIPLE OBJECTS CASE

(75) Inventors: Young Kwon Lim, Daejeon (KR); Sang Kyu Park, Daejeon (KR); Chie Teuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/729,021

(22) Filed: Dec. 8, 2003

(65) Prior Publication Data

US 2004/0114811 A1    Jun. 17, 2004

Related U.S. Application Data

(63) Continuation of application No. 09/486,991, filed as application No. PCT/KR98/00089 on Apr. 14, 1998, now Pat. No. 6,707,944.

(30) Foreign Application Priority Data

Sep. 4, 1997 (KR) .......................................... 97-45740

(51) Int. Cl.
    *G06K 9/36* (2006.01)

(52) U.S. Cl. .................................... 382/232

(58) Field of Classification Search ............... 382/232, 382/234, 236, 238, 239, 242, 243, 248, 250, 382/252; 348/400.1–402.1, 407.1, 409.1, 348/410.1–416.1, 420.1; 375/240.08, 240.1, 375/240.12, 240.22; 341/110, 123, 124, 126, 341/200

See application file for complete search history.

(56) References Cited

U.S. PATENT DOCUMENTS

| | | | |
|---|---|---|---|
| 5,815,689 A | 9/1998 | Shaw et al. |
| 5,978,510 A | 11/1999 | Chung et al. |
| 6,091,857 A | 7/2000 | Shaw et al. |
| 6,233,356 B1 | 5/2001 | Haskell et al. |
| 6,301,303 B1 | 10/2001 | Chung et al. |

FOREIGN PATENT DOCUMENTS

| | | |
|---|---|---|
| JP | 05-236286 | 9/1993 |
| JP | 6-291777 | 10/1994 |
| JP | 8-130739 A | 9/1996 |
| JP | 09-182071 | 7/1997 |
| WO | WO - 96/42 169 A1 | 12/1996 |

*Primary Examiner*—Jose L. Couso
(74) *Attorney, Agent, or Firm*—Antonelli, Terry, Stout & Kraus, LLP

(57) ABSTRACT

A computational graceful degradation method is disclosed using priority information in multiple objects case. The method degrades the amount of computation in different ratio every object using the priority information if computational power of a decoder does not come up to that necessary for processing encoded multimedia data as decoding the multimedia data encoded by several objects unit, the priority information being determined by an encoder for optimal graceful degradation in terms of relatively importance between respective objects.

4 Claims, 3 Drawing Sheets

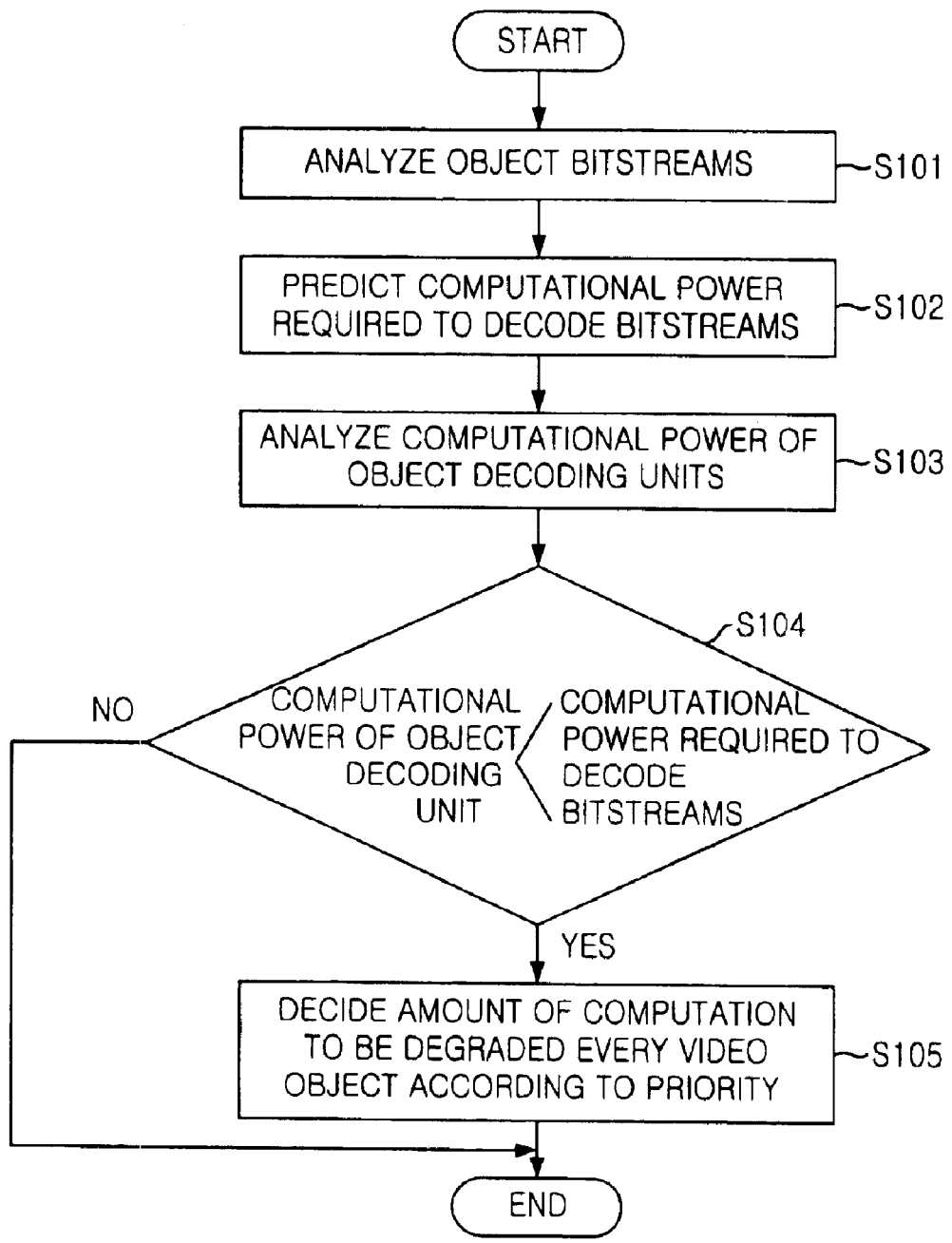

COMPUTATIONAL GRACEFUL DEGRADATION METHOD USING PRIORITY INFORMATION IN MULTIPLE OBJECTS CASE

CROSS-REFERENCE TO RELATED APPLICATIONS

This application is a continuation of application Ser. No. 09/486,991 filed on May, 2, 2000, now U.S. Pat. No. 6,707,944, which is a 371 of PCT/KR98/00089, filed Apr. 14, 1998. The contents of application Ser. No. 09/486,991 are hereby incorporated herein by reference in their entirety.

TECHNICAL FIELD

The present invention relates to a computational graceful degradation method using priority information in multiple objects case. More particularly, the present invention relates to a method for degrading the amount of computation in different ratio every video object using the priority information if computational power of a decoder does not come up to that necessary for processing encoded multimedia data as decoding the multimedia data encoded by several objects unit, the priority information being determined by an encoder for optimal graceful degradation in terms of relatively visual importance between respective video objects.

BACKGROUND ART

Recently, the MPEG {Moving Picture Experts Group} standard, i.e., an international standard of media integration type moving picture compressing technique capable of compressing many informations, have been widely used according to development of multimedia techniques integrating audio, data and video.

MPEG techniques capable of compressing many informations are applied to a communication, broadcasting, home appliances, computer, CD-ROM, etc., to synchronize the audio and video, thus multiplexing the audio and video.

Generally, a bitrate of MPEG bitstream data, which is a system stream mixed with the audio and video signals, is determined according to a kind of channel and memory or display. Such a bitstream data is received to the MPEG decoder and first, decoding of the system stream is executed to obtain audio bitstream informations, video bitstream informations and additional informations mixed into the system stream.

The prior art MPEG decoder decodes MPEG bitstream data to write the decoded results in an external memory. Then, the decoder converts the decoded results into analog signals so that we can hear the audio or see the video.

Generally, since each platform has different computational power, it is necessary to provide the maximum quality of the services which is achievable with the capabilities of each platform. And also, it is mandatory that all decoders can decode all MPEG-4 services but at different levels of quality. It means that a scalability based on computational power is needed. The scalability should enable a graceful degradation of the quality when less than theoretically necessary computational power is available at decoding side.

The conventional computational graceful degradation method has been proposed in MPEG96/0925 by M. Mattavelli et al. to reduce the amount of computation when decoding the encoded multimedia data. The method decreases, in a lump, the amount of computation necessary for decoding without consideration of relative importance between the respective video objects if computational power of the decoder does not come up to that necessary for processing the encoded multimedia data. In the conventional method, however, there exists a problem which does not make full use of the relative importance between the respective video objects.

The conventional method has considered only a single video object (VO) case. A video scene, however, is composed of multiple VOs which can be further decomposed into several video object layers (VOLs) in order to allow scalability. The various degree of visual importance of these VOs and VOLs should be exploited for the simplified decoding in the context of computation graceful degradation.

DISCLOSURE OF INVENTION

Accordingly, it is an object of the present invention to provide a method for degrading the amount of computation in different ratio every video object using the priority information if computational power of a decoder does not come up to that necessary for processing encoded multimedia data, the priority information being determined by an encoder for optimal graceful degradation in terms of relatively visual importance between respective video objects.

According to the present invention, there is provided a computational graceful degradation method in an MPEG encoder and decoder system comprising: an encoder including a multimedia object dividing unit for dividing an input multimedia into a plurality of objects according to its content and characteristic, a plurality of object encoding units for encoding the corresponding input multimedia objects from the multimedia object dividing unit, a multiplexer for multiplexing a plurality of encoded multimedia object bitstreams to transmit a multiplexed multimedia object bitstream; and a decoder including a demultiplexer for demultiplexing the multiplexed multimedia object bitstream received from the multiplexer to output a plurality of demultiplexed multimedia object bitstreams, a plurality of object decoding units for decoding the corresponding multimedia object bitstream applied from the demultiplexer, and a multimedia constructing unit for reconstructing the decoded multimedia objects to generate a reconstructed multimedia to user.

The method comprises the steps of determining, in the multiplexer, a priority of the respective objects according to relative importance between the objects before multiplexing the encoded object bitstreams to transmit, considering that the computational graceful degradation will be applied in the decoder, and determining, in the demultiplexer, an amount of computation to be degraded in different ration every video object using the priority information determined according to the respective objects.

The step for determining the amount of degrading computation comprises after demultiplexing the multiplexed object bitstream, analyzing the respective demultiplexed object bitstreams to predict the computational power required to decode the respective demultiplexed object bitstreams, analyzing the computational power of the object decoding units, deciding whether the computational power of the object units exceeds that required to decode the respective demultiplexed object bitstreams or not, and deciding an amount of computation to be degraded every video object using the priority information, if the computational power of the object decoding units does not come up to that required.

According to the above present invention, the multimedia decoding which is more suitable for a characteristic of the respective object can be executed in the same case, by computational graceful degradation in terms of relatively visual importance between the multimedia objects having characteristic different from each other.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the drawings:

FIG. 2 is a flow chart explaining a computational graceful degradation method according to a preferred embodiment of the present invention.

BEST MODE FOR CARRYING OUT THE INVENTION

Reference will now be made in detail to the preferred embodiment of the present invention, examples of which are illustrated in the accompanying drawings.

Figure 1A:
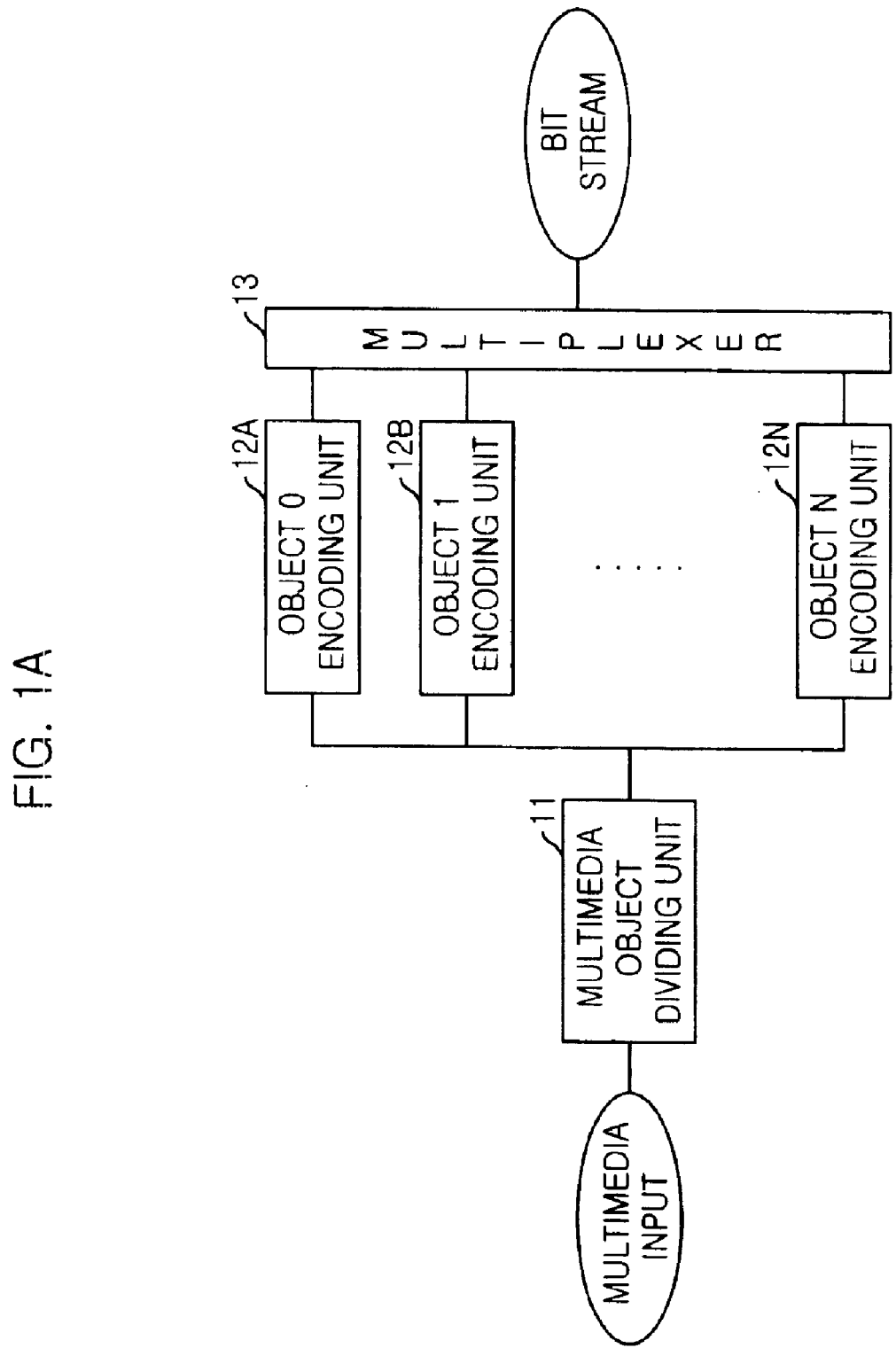
FIGS. 1A and 1B are block diagrams showing an MPEG encoder and decoder system to which the present invention can be applied.
Figure 1B:
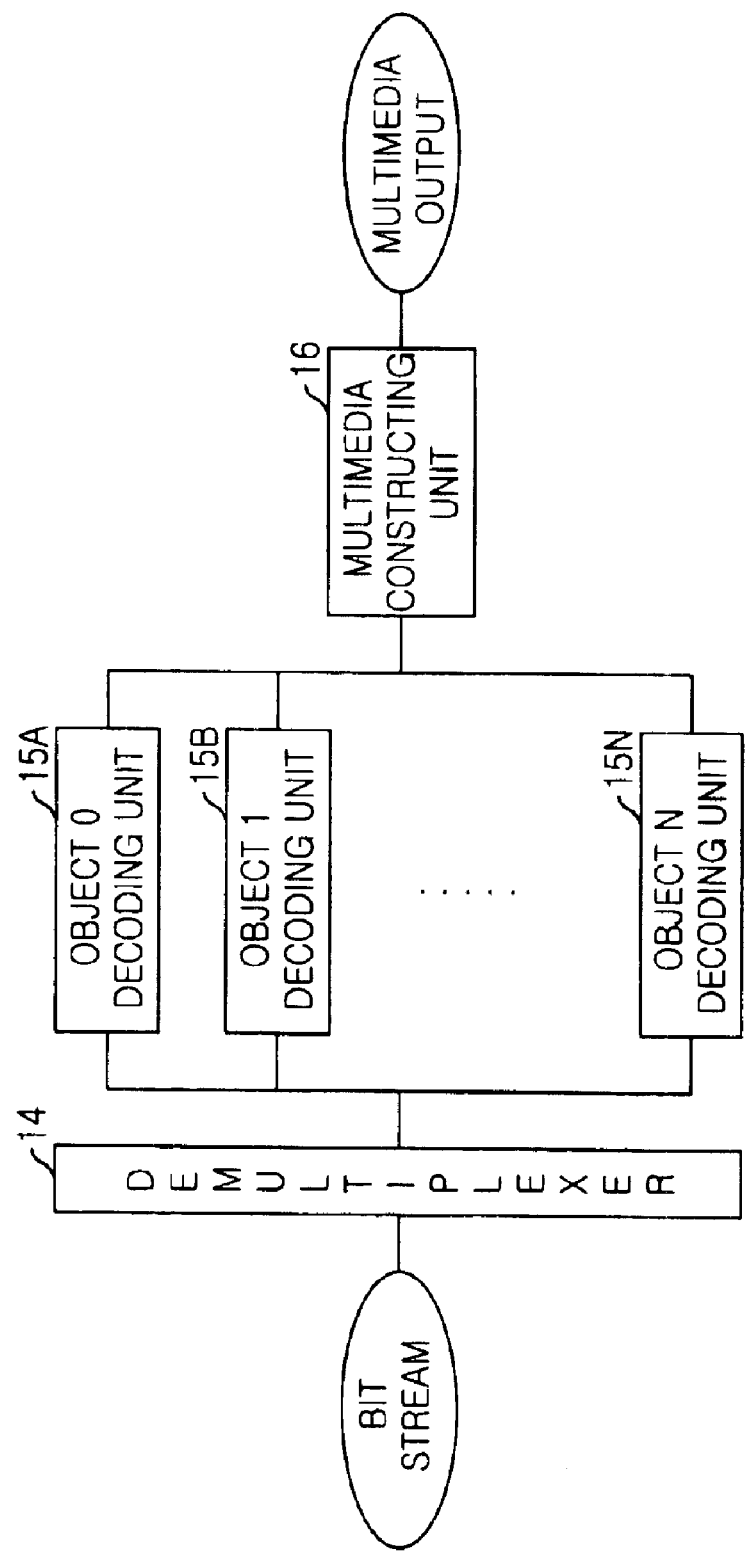

FIGS. 1A and 1B show an MPEG encoder and decoder system to which the present invention can be applied. Reference numeral 11 indicates a multimedia object dividing unit, 12a to 12n a plurality of object encoding units, 13 a multiplexer, 14 a demultiplexer, 15a to 15n a plurality of object decoding units, and 16 a multimedia constructing unit, respectively.

First, in the encoder, the multimedia object dividing unit 11 divides an input multimedia into a plurality of objects according to its content and property to output them to the plurality of object encoding units 12a to 12n.

Next, each of the object encoding units 12a to 12n encodes the corresponding input multimedia objects from the multimedia object dividing unit 11.

Then, the multiplexer 13 multiplexes a plurality of multimedia object bitstreams which are encoded by each of the object encoding units 12a to 12n to transmit a multiplexed multimedia object bitstream to the decoder.

In the decoder, the demultiplexer 14 demultiplexes the multiplexed multimedia object bitstream received from the multiplexer 13 to output a plurality of demultiplexed multimedia object bitstreams to the plurality of object decoding units 15a to 15n.

Next, each of the plurality of object decoding units 15a to 15n decodes the corresponding multimedia object bitstream applied from the demultiplexer 14, and then the multimedia constructing unit 16 reconstructs the decoded multimedia objects to generate the reconstructed multimedia to user.

If the present invention is applied to the above MPEG encoder and decoder system, the operation of the system will now be explained with reference to FIG. 2.

First, the multiplexer 13 determines the priority of the respective video objects (VOs) according to relatively visual importance between the respective VOs before multiplexing the encoded object bitstreams to transmit, considering that the computational graceful degradation is applied in the decoder.

The demultiplexer 14 executes processes shown in a flow chart explaining a computational graceful degradation method of FIG. 2.

After the demultiplexer 14 demultiplexes the input bit stream, the demultiplexer 14 analyzes the respective demultiplexed object bitstreams before transferring them to the object decoding units 15a to 15n at step S101.

Then, the demultiplexer 14 predicts the computational power required to decode the respective objects bitstreams according to the above analysis at step S102, and analyzes the computational power of the object decoding units 15a to 15n at step S103.

According the above analysis, the demultiplexer 14 decides whether the computational power of the object decoding units 15a to 15n exceeds that required to decode the respective object bitstreams or not at step S104.

As a result of decision, if the computational power of the object decoding units 15a to 15n does not come up to that required to decode, the demultiplexer 14 decides the amount of computation to be degraded every video object using the priority information determined by the multiplexer 13, thereby providing the amount of computation to be degraded with the object decoding units 15a to 15n.

If the computational power of the object decoding units 15a to 15n exceed the required, the demultiplexer 14 provides the demultiplexed object bitstreams with the object decoding units 15a to 15n without computation of the amount to be degraded.

To encode a moving picture of the tennis player which plays tennis in the tennis ground is explained as an example. If encoding the tennis player and the background as respective video object, since most people are more interested in the tennis player than the background, it is a desirable strategy to keep the quality of the tennis player higher than that of the background. That is, the tennis player object is more relatively important than the background object.

Therefore, when the computational graceful degradation method is applied in the decoder, the multiplexer 13 can decide that the priority of the tennis player object is "one" and the priority of the background object is "three", so that the background object could be decoded with degradation of the computational amount three times as compared with that of the tennis player object.

Further, if the computational power required to decode the background object, which is predicted by the demultiplexer 14, is 30000 instructions per second and the tennis player object 2000 instructions per second, and the computational power of the object decoding units 15a to 15n is 40000 instructions per second, the computational power of 10000 instructions per second lacks totally.

Therefore, according to the order of the priority decided in the multiplexer 13, to degrade the computational amount of the background object three times as compared with that of the tennis player, it could be determined that the computational amount of 7500 instructions per second is degraded and decoded in case of the background object, and the computational amount of 2500 instructions per second is degraded and decoded in case of the tennis player object.

While the invention has been described in conjunction with specific embodiments thereof, it is evident that several alternatives, modifications, and variations will be apparent to those skilled in the art in light of the foregoing description. Accordingly, it is intended to embrace all such alternatives, modifications, and variations as fall within the spirit and broad scope of the following claims.

INDUSTRIAL APPLICABILITY

According to the present invention, the multimedia decoding which is more suitable for a characteristic of the respective object can be executed in the same case, by computational graceful degradation in terms of relatively visual importance between the multimedia objects having characteristic different from each other.

What is claimed is:

1. A computational graceful degradation method in a system comprising an encoder for encoding multimedia objects and multiplexing a plurality of encoded multimedia object bitstreams to transmit a multiplexed multimedia object bitstream; and a decoder for demultiplexing the multiplexed multimedia object bitstream received from the encoder, and decoding corresponding multimedia object bitstream for reconstruction to generate reconstructed multimedia to user, the method comprising the steps of:

determining, in the encoder, a priority of the respective objects according to a relative importance between the objects before multiplexing the encoded object bitstream for transmission, considering that the computational graceful degradation will be applied in the decoder; and determining, in the decoder, an amount of computational power to be degraded in different ratio every object using priority information determined according to the respective objects.

2. The method as claimed in claim 1, wherein said step for determining the amount of computational power comprising the steps of:

after demultiplexing the multiplexed object bitstream, analyzing respective demultiplexed object bitstreams to predict the computational power required to decode the respective demultiplexed object bitstreams;

analyzing the computational power;

determining whether the computational power exceeds that required to decode the respective demultiplexed object bitstreams; and determining an amount of computational power to be degraded every video object using the priority information, if the computational power of the object decoding units does not exceed that required to decode the respective demultiplexed object bitstreams.

3. A method for generating an object bitstream to be transmitted to an MPEG decoder system, the object bitstream corresponding to a plurality of objects of multimedia data, wherein each of the objects in the object bitstream is encoded, and priority information of respective objects according to a relative importance between respective objects is determined before multiplexing an encoded object bitstream for transmission to the MPEG decoder system.

4. An object bitstream transmitted from an MPEG encoder system to an MPEG decoder system, via a transmission medium, the object bitstream corresponding to a plurality of objects of multimedia data, wherein each of the objects in the object bitstream is encoded, and priority information of respective objects according to a relative importance between respective objects is determined before multiplexing an encoded object bitstream for transmission to the MPEG decoder system.

* * * * *